(12) United States Patent
Sokolean et al.

(10) Patent No.: US 10,082,300 B2
(45) Date of Patent: Sep. 25, 2018

(54) RADIANT HEATING AND COOLING SYSTEM

(71) Applicant: Barcol-Air, Ltd., Oxford, CT (US)

(72) Inventors: Helmuth Sokolean, Shelton, CT (US); Martinus George Hoekstra, Shelton, CT (US)

(73) Assignee: Barcol-Air, Ltd., Oxford, CT (US)

( * ) Notice: Subject to any disclaimer, the term of this patent is extended or adjusted under 35 U.S.C. 154(b) by 407 days.

(21) Appl. No.: 14/413,925

(22) PCT Filed: Sep. 2, 2014

(86) PCT No.: PCT/US2014/053724
§ 371 (c)(1),
(2) Date: Jan. 9, 2015

(87) PCT Pub. No.: WO2015/031896
PCT Pub. Date: Mar. 5, 2015

(65) Prior Publication Data
US 2015/0300657 A1    Oct. 22, 2015

Related U.S. Application Data

(60) Provisional application No. 61/872,403, filed on Aug. 30, 2013.

(51) Int. Cl.
*F24D 3/14* (2006.01)
*F24D 3/16* (2006.01)
(Continued)

(52) U.S. Cl.
CPC ............ *F24D 3/141* (2013.01); *F24D 3/165* (2013.01); *F24F 3/14* (2013.01); *F24F 5/0089* (2013.01);
(Continued)

(58) Field of Classification Search
CPC . F24D 3/14; F24D 3/141; F24D 3/147; F24D 3/148; F24D 3/165; F24F 5/0003;
(Continued)

(56) References Cited

U.S. PATENT DOCUMENTS 4,766,951 A  *  8/1988  Bergh ................... F24D 3/165
                                                      165/171
5,042,570 A  *  8/1991  Schmitt-Raiser ....... E04B 9/064
                                                      165/171
(Continued)

FOREIGN PATENT DOCUMENTS

WO         2013111099 A2      8/2013

OTHER PUBLICATIONS

International Search Report and the Written Opinion of the International Searching Authority, International Application No. PCT/US2014/053724, filed Dec. 23, 2014.
(Continued)

*Primary Examiner* — Grant Moubry
*Assistant Examiner* — Hans Weiland
(74) *Attorney, Agent, or Firm* — Murtha Cullina LLP; Anthony P. Gangemi

(57) ABSTRACT

A heat exchange assembly is disclosed. In some embodiments, the heat exchange assembly includes a plurality of profiles arranged in an parallel array, each profile including a first distal portion, a central portion and a second distal portion, with a length and a width of the central portion defining a plane, the first distal portion having a curvature departing from this plane in a first direction, and the second distal portion having a curvature departing from this plane in a second direction that is opposite the first direction. An amount of piping is thermally coupled with and disposed along the length the central portion of each profile. A bracketing system statically anchors the profiles to a surface.

(Continued)

Fluid is circulated within the piping to facilitate heat exchange between the assembly and the surrounding environment.

8 Claims, 11 Drawing Sheets

(51) Int. Cl.
*F24F 5/00* (2006.01)
*F28F 1/30* (2006.01)
*F24F 3/14* (2006.01)
*F24F 11/30* (2018.01)
*F24F 13/22* (2006.01)
*F28D 1/02* (2006.01)
*F28D 21/00* (2006.01)
*F24F 110/20* (2018.01)

(52) U.S. Cl.
CPC ............... *F24F 11/30* (2018.01); *F28F 1/30* (2013.01); *F24F 2013/221* (2013.01); *F24F 2110/20* (2018.01); *F28D 2001/0286* (2013.01); *F28D 2021/0035* (2013.01); *F28F 2215/08* (2013.01)

(58) Field of Classification Search
CPC .... F24F 5/0089; F24F 3/01; F28F 1/20; F28F 1/30
USPC ........... 122/510, 511; 165/48.2, 49, 53, 179, 165/185, 230; 248/68.1
See application file for complete search history.

(56) References Cited

U.S. PATENT DOCUMENTS

| | | | |
|---|---|---|---|
| 5,363,908 A | 11/1994 | Koster | |
| 5,454,428 A | 10/1995 | Pickard et al. | |
| 5,950,720 A * | 9/1999 | Klix | F24D 3/165 |
| | | | 165/179 |
| 6,073,407 A | 6/2000 | Sokolean | |
| 7,140,425 B2 * | 11/2006 | Romero-Beltran | F28F 1/22 |
| | | | 126/662 |
| 7,725,011 B2 * | 5/2010 | Boussier | F24D 3/165 |
| | | | 392/407 |
| 2007/0034364 A1 * | 2/2007 | Wieder | F24D 3/14 |
| | | | 165/171 |
| 2013/0199772 A1 * | 8/2013 | Fischer | F28F 27/00 |
| | | | 165/287 |

OTHER PUBLICATIONS

Barcol-Air Radiant Wave Literature, dated Oct. 9, 2012.
Barcol-Air Radiant Wave Heating and Cooling Capacity Data, 96mm profile spacing. Data compiled Aug. 30, 2013.

* cited by examiner

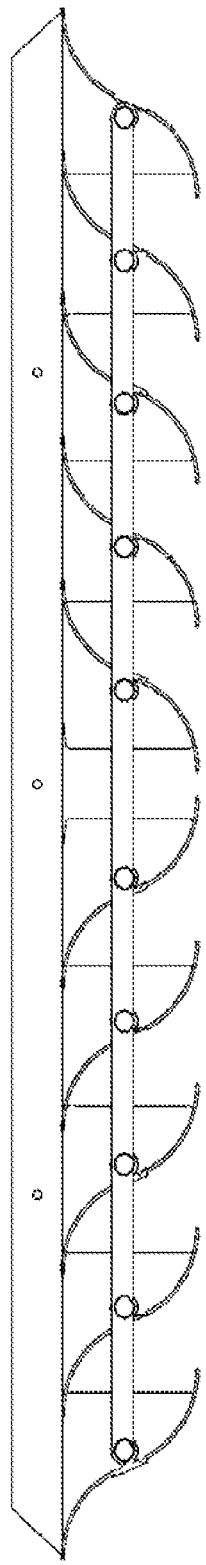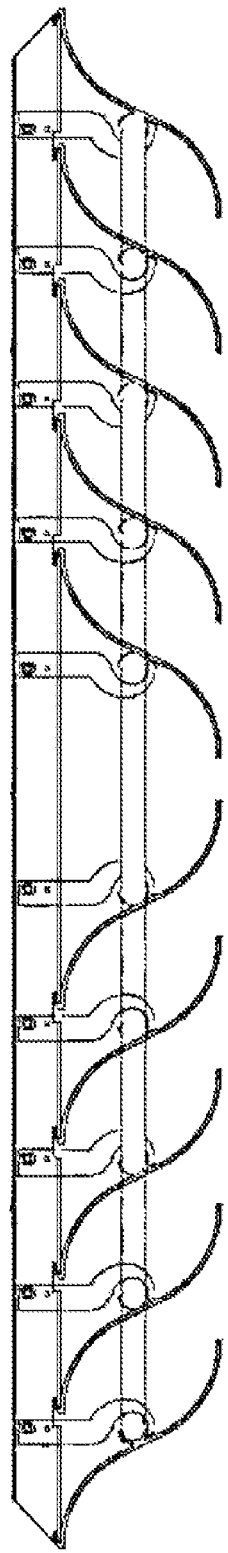
FIG. 4A
FIG. 4B

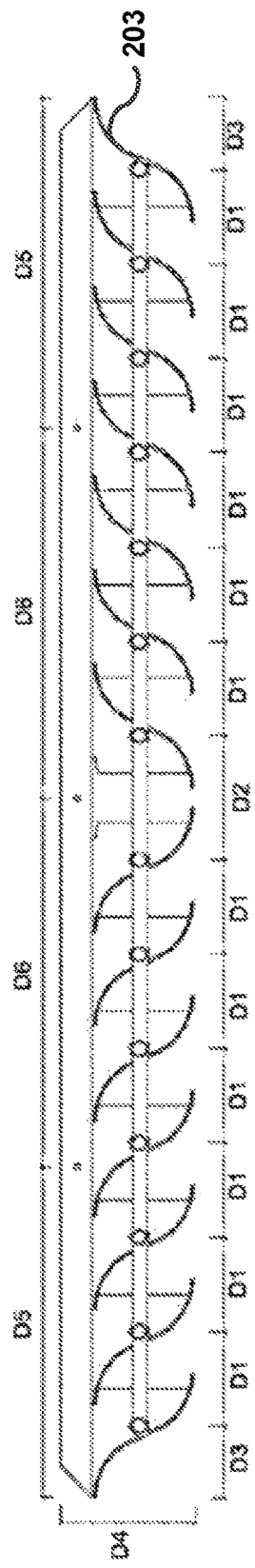
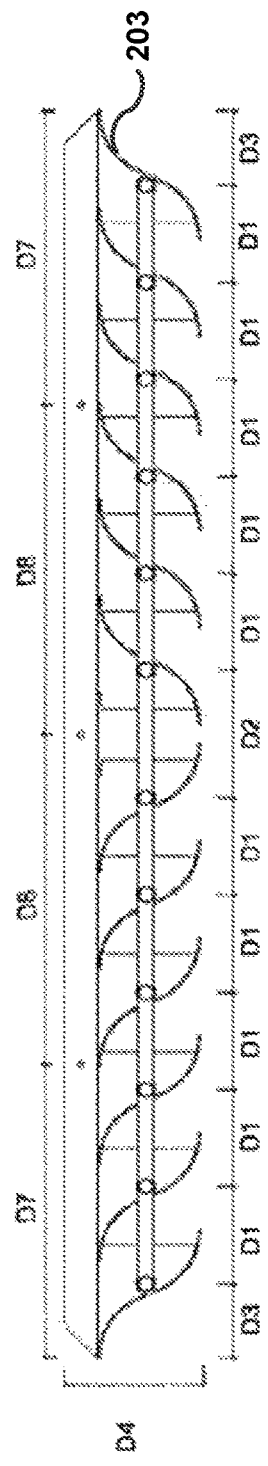
FIG. 6A
FIG. 6B

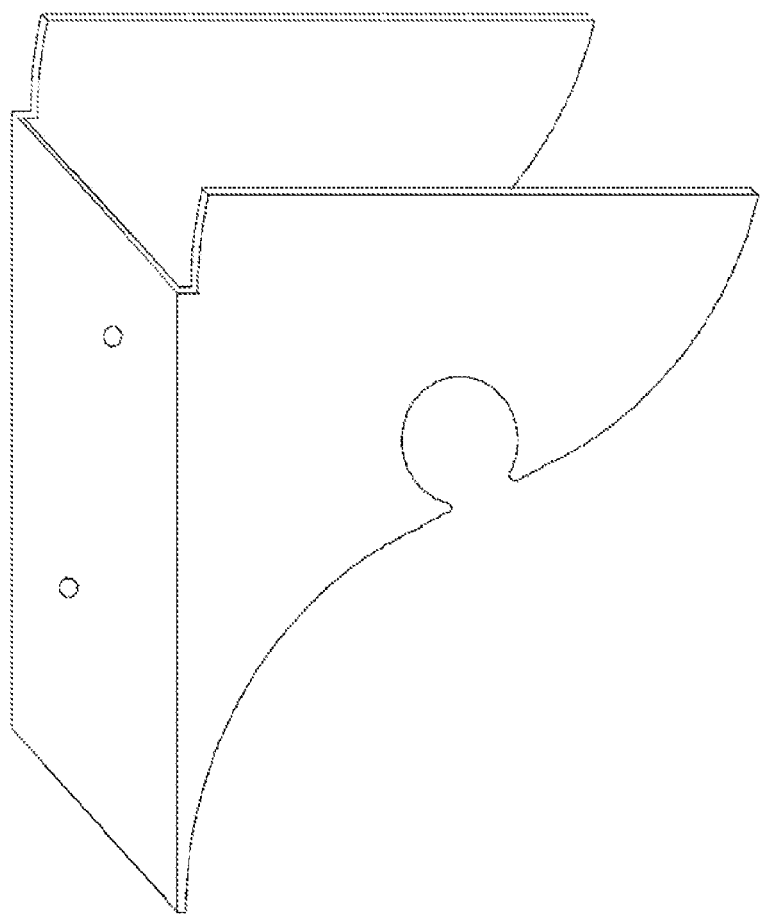

RADIANT HEATING AND COOLING SYSTEM

CROSS REFERENCE TO RELATED APPLICATION(S)

This application claims benefit of U.S. Provisional Patent Application No. 61/872,403, filed Aug. 30, 2103, that is incorporated by reference as if disclosed herein in its entirety.

BACKGROUND

Environmental temperature control has long been a desirable capacity and numerous systems have been implemented in this respect. Many environments may at times require cooling while at other times requiring heating. Temperature control systems employing either convection heat exchange or radiant heat exchange have been developed.

However, in many instances such systems require considerable energy to operate. Inefficiency can lead to high operating costs and adverse environmental impact. Therefore high efficiency systems remain desired.

The subject matter of the present disclosure is directed to overcoming, or at least reducing the effects of, one or more of the problems set forth above.

SUMMARY

Disclosed is a heat exchange assembly for regulating the temperature of an environment. Embodiment systems have been found to be of higher efficiency than previous systems.

In an embodiment, an array of profiles is disposed in an environment, for example an office area requiring temperature control. Each of the profiles is a panel having elongated serpentine curvatures and a protruding channel. Within each channel is a pipe that is thermally coupled to its respective profile. A fluid circulatory system produces fluid flow through the piping. If the system is acting to cool an area, then fluid having a temperature lower than the temperature of the environment is circulated. The profiles are cooled by the pipes through conduction, and the environment is cooled by the profiles through radiant and convective heat transfer. The profiles are spaced apart from one another by a distance effective to facilitate this heat transfer. The system is suspended from the ceiling of the area to be cooled by a frame and a number of support brackets, with the pipes positioned on the upper surface of the profiles so as to be hidden from view. Thus an efficient, aesthetically pleasing heat exchange system is provided.

In certain embodiments, slots are formed in the profiles, increasing the available surface area for radiant heat exchange and facilitating airflow through the profiles.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which:

FIG. 4A is a side plan view of another embodiment heat exchange assembly having contoured support brackets.

FIG. 4B is a side plan view of another embodiment heat exchange assembly having hook support brackets.

FIG. 6A is a side-view schematic illustration of another embodiment heat exchange assembly.

FIG. 6B is a side-view schematic illustration of another embodiment heat exchange assembly.

FIG. 10 is a perspective view of a support bracket of an embodiment.

Like reference numbers and designations in the various drawings indicate like elements.

DETAILED DESCRIPTION

Disclosed is a heat exchange assembly for controlling the temperature of an environment.

Figure 1:
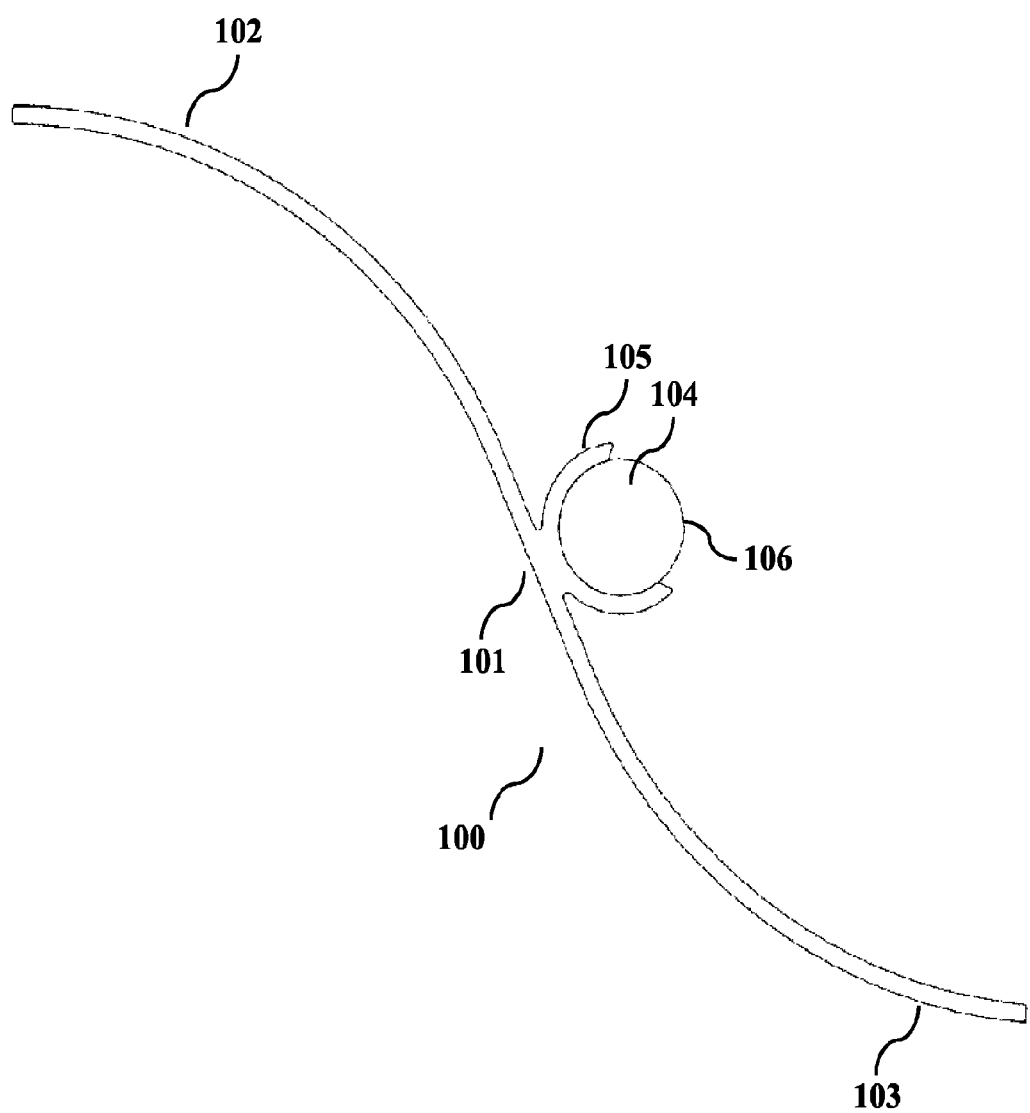
FIG. 1 is side-view schematic illustration of a profile according to an embodiment.

FIG. 1 is a side-view schematic drawing of wave-like profile, or sail, 100 configured for use in an embodiment heat exchange assembly. Profiles provide a surface from which energy is exchanged between an embodiment heat exchange assembly and an operating environment. Profile 100 includes central portion 101, first distal portion 102 and second distal portion 103. The width, or thickness of profile 100, and its length (into the page), together define a plane. First distal portion 102 has a curvature that departs from this plane in a first direction. Second distal portion 103 departs from the plane in a second direction that is also opposite of the curvature of first distal portion 102. Optionally, the curvature of first distal portion 102 is a mirror image of second distal portion 103, centered around the plane defined by the width and length of center portion 101.

Piping 104 is thermally coupled with profile 100 and is disposed along the length of center portion 101 and parallel to the length-wise axis of center portion 101. Profile 100 has protruding channel 105 wherein piping 104 is disposed. In the embodiment, channel 105 is thermally coupled with greater than 55% of the circumference of outer surface 106 of piping 104. Preferably channel 105 and piping 104 are manufactured so that piping 104 can be snapped into channel 105 and thereby be retained. In the embodiment, piping 104 does not reach beyond the vertical edges of profile 100, thereby remaining concealed. Piping 104 is configured to circulate fluid having a temperature differential with respect to the environment in which the heat exchange assembly is disposed. This allows for conductive thermal energy transfer between the piping and the profiles and allows for radiant and convective thermal energy transfer between the profiles and the environment. Connections to water mains are located on the top of the profile.

Preferably, profile 100 is constructed from aluminum or an aluminum alloy, while piping 104 is a precision drawn copper tube.

Figure 2:
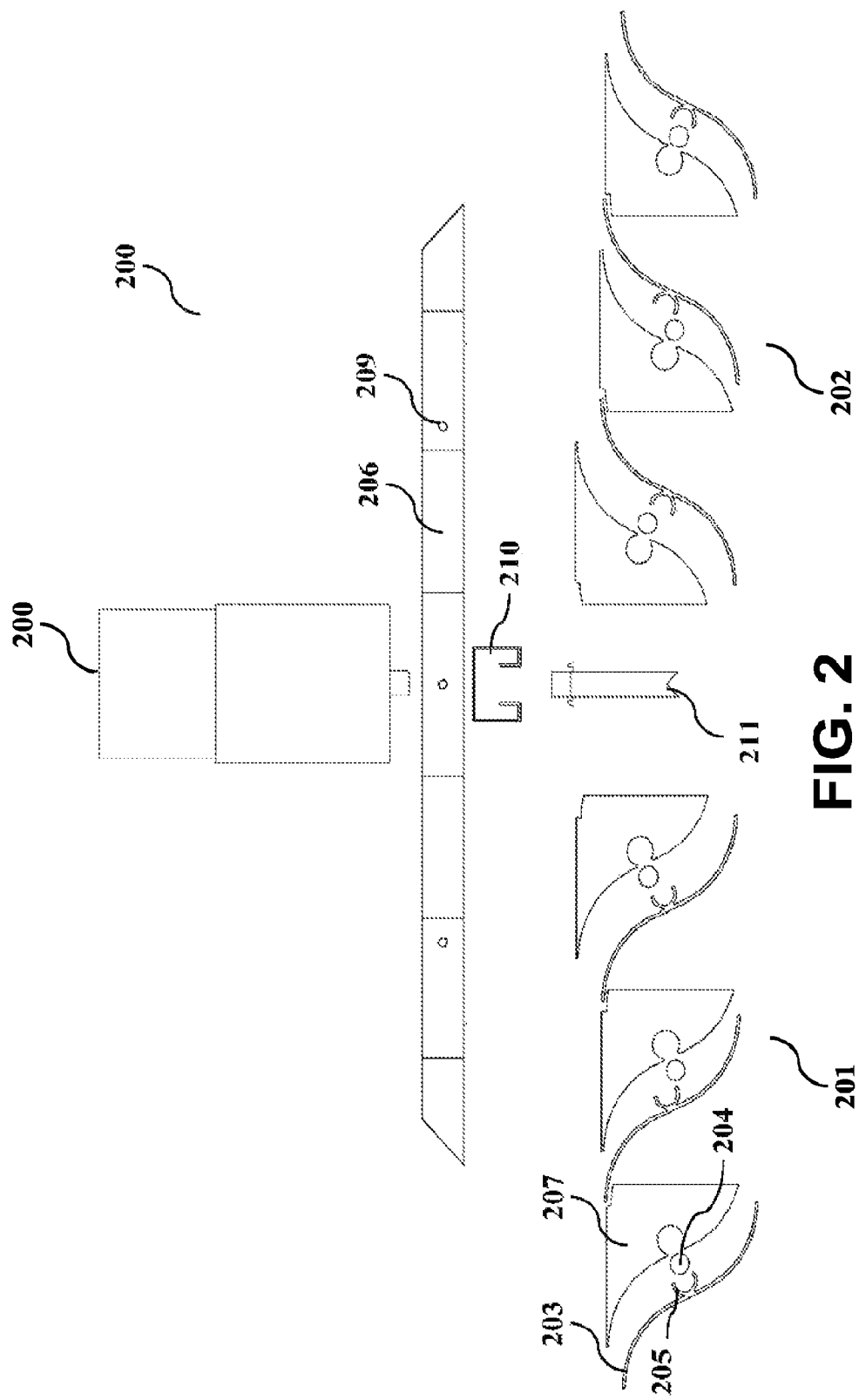
FIG. 2 is an exploded side-view schematic illustration of an embodiment heat exchange assembly.

FIG. 2 is an exploded side-view schematic drawing of embodiment heat exchange assembly 200. Heat exchange assembly 200 includes first group of profiles 201 and second group of profiles 202. Profile 203 has a cross section characterized by serpentine curvature. Piping 204 is thermally coupled to profile 203 (when assembled) via channel 205 and is disposed parallel to the longitudinal axis of profile 203. Frame 206 provides support for and allows for the integration of the various profiles. Support brackets 207 are used to attach the profiles to frame 206. In use, piping 204 receives fluid flow through it that is effective to either heat or cool the environment, depending on the temperature control that is desired. Connections are made to a water source at the top of profiles 201. Water is supplied from water mains (not shown) via flex hoses and nipples to piping 204. The longitudinal axis of the profiles are spaced apart from one another by a minimal distance that is sufficient to facilitate efficient convective heat exchange between the profiles and the environment. In situations where both heating and cooling may be required, a changeover valve can be employed. Anchor 208 connects frame 206 to a surface, in this case a ceiling. Frame 206 has attachment points 209. Mounting bracket 210 receives mounting rod 211.

Figure 3:
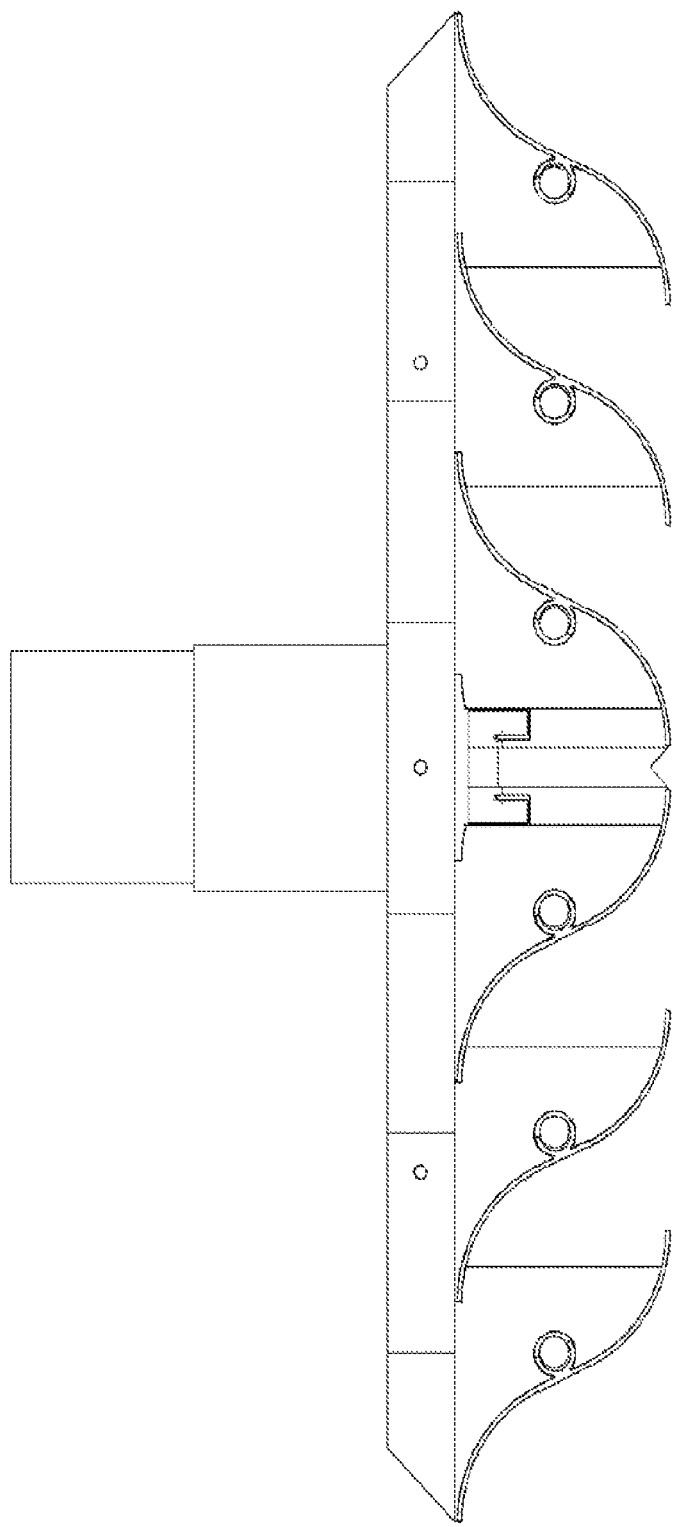
FIG. 3 is a side-view schematic illustration of the heat exchange assembly of FIG. 2.

FIG. 3 depicts an assembled embodiment heat exchange assembly, suspended from a ceiling (not pictured) of an environment. When in a cooling mode, hot air from the environment rises and is cooled by the profiles. Cooled air then sinks, creating circulation that facilitates heat exchange between the environment and the heat exchange assembly.

Systems according to the disclosed subject matter can be custom manufactured to accommodate various sizes. Certain embodiment profiles range in length from about 1800 mm to 3600 mm, preferably in increments of 300 mm. There are no restrictions on the number of profiles that can be deployed in embodiment heat exchange assemblies, but preferably fluid pressure is maintained above 45 kPa. Profile appearance can be custom tailored to various needs, although low gloss levels and a non-metallic finish are preferred. Profiles of embodiment heat exchange assemblies may be controlled individually or via zone, depending on the particular application.

FIG. 4A is a side plan view of another embodiment heat exchange assembly having 10 profiles that are supported by contoured support brackets. FIG. 4B is a side plan view of another embodiment heat exchange also employing 10 profiles but with connection provided by hook support brackets connected to the piping.

Figure 5C:
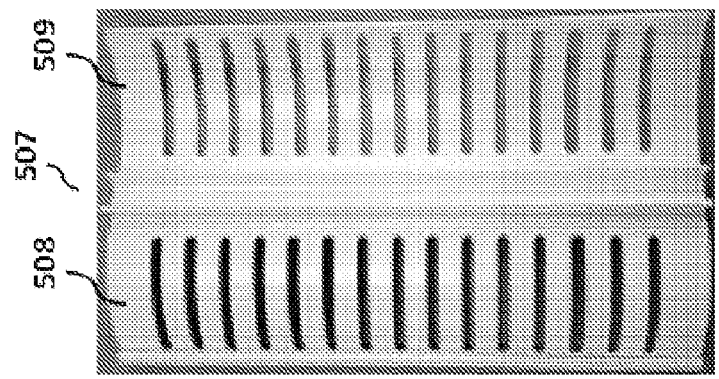
FIG. 5C is a perspective illustration of a profile having slots on the entirety of its surface according to another embodiment.
Figure 5B:
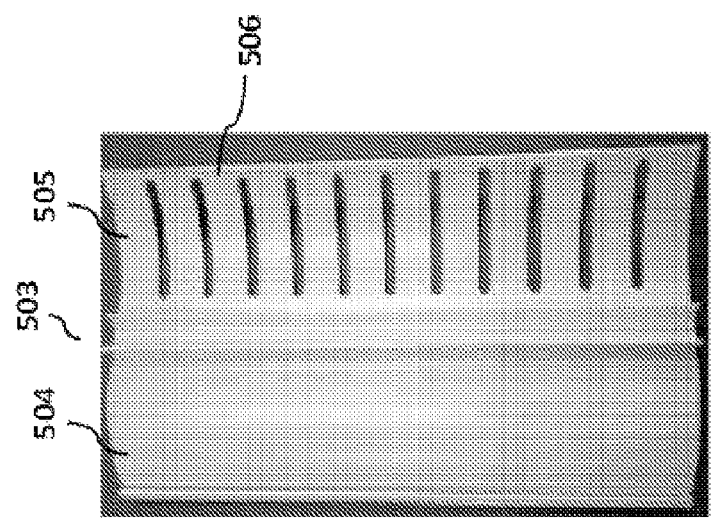
FIG. 5B is a perspective illustration of a profile having slots on a portion of its surface according to another embodiment.
Figure 5A:
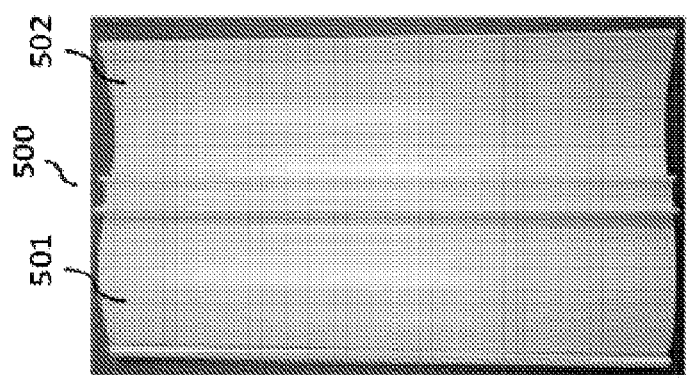
FIG. 5A is a perspective illustration of a solid profile according to an embodiment.

FIGS. 5A-C show various possible designs for embodiment profiles. With respect to FIG. 5A, profile 500 has first distal portion 501 and second distal portion 502, both of which have a solid surface. With respect to FIG. 5B, profile 503 has a first distal portion 504 that is solid and second distal portion 505 that has a plurality of slots 506 formed in its surface. In the embodiment, slots 506 are formed in a radial fashion from the center of profile 503. FIG. 5C shows profile 507, wherein both first distal portion 508 and second distal portion 509 have slots formed therein. It should be understood by those of skill in the art to which the present disclosure pertains that slots can take on various geometries and may be located in various patterns. The presence of slots may increase the surface area available for conductive heat transfer to the environment and may also produce convective airflow around the profile, resulting in more efficient heat exchange with the environment. In embodiment heat exchange assemblies, some profiles may have slots while others do not, depending on the desired configuration. Profiles may optionally be powder coated, or may consist of bare metal.

FIG. 6A depicts another embodiment heat exchange assembly. Profiles, of which there are 14 in the particular embodiment, are each characterized by a first and a second constant-curvature section. These sections are mirrored in respect to one another around a central axis running along the length of the profile. Each profile also has a c-shaped channel disposed on its exterior, the lengthwise axis of which is substantially parallel to the central axis of the profile. Each channel has seated in it a pipe that is in thermal connection with the channel. A flow control unit (not pictured) controls fluid flow through the pipes, thereby regulating the temperature of the environment in which the heat exchange assembly is disposed. The profiles are spaced apart by a spacing D1 from one another by a distance effective to allow efficient convective heat exchange between the panels and the environment. In the embodiment, the distance between adjacent profiles is preferably at least 85 mm. In constructed embodiments, 96 mm was found to produce efficient heat exchange. Other dimensions are provided for reference. In the embodiment, dimension D2 is 126 mm dimension D3 is 73 mm and dimension D4 is 13 7 mm. Dimensions D5 and D6 are dependent 30 on the number of profiles included in the embodiment, and in this instance are 336 mm and 376 mm, respectively. FIG. 6B depicts another embodiment having 12 profiles. Dimensions D1, D2, D3, and D4 are the same as for the embodiment of FIG. 6A. However, dimension D7 is 249 mm and dimension D8 is 289 mm. Other embodiments having different profile configurations should be understood to be within the scope of the present disclosure. For instances, embodiment heat exchange assemblies could employ only 10, 8 or 6 profiles, depending on the needed heating or cooling capacity.

Figure 7:
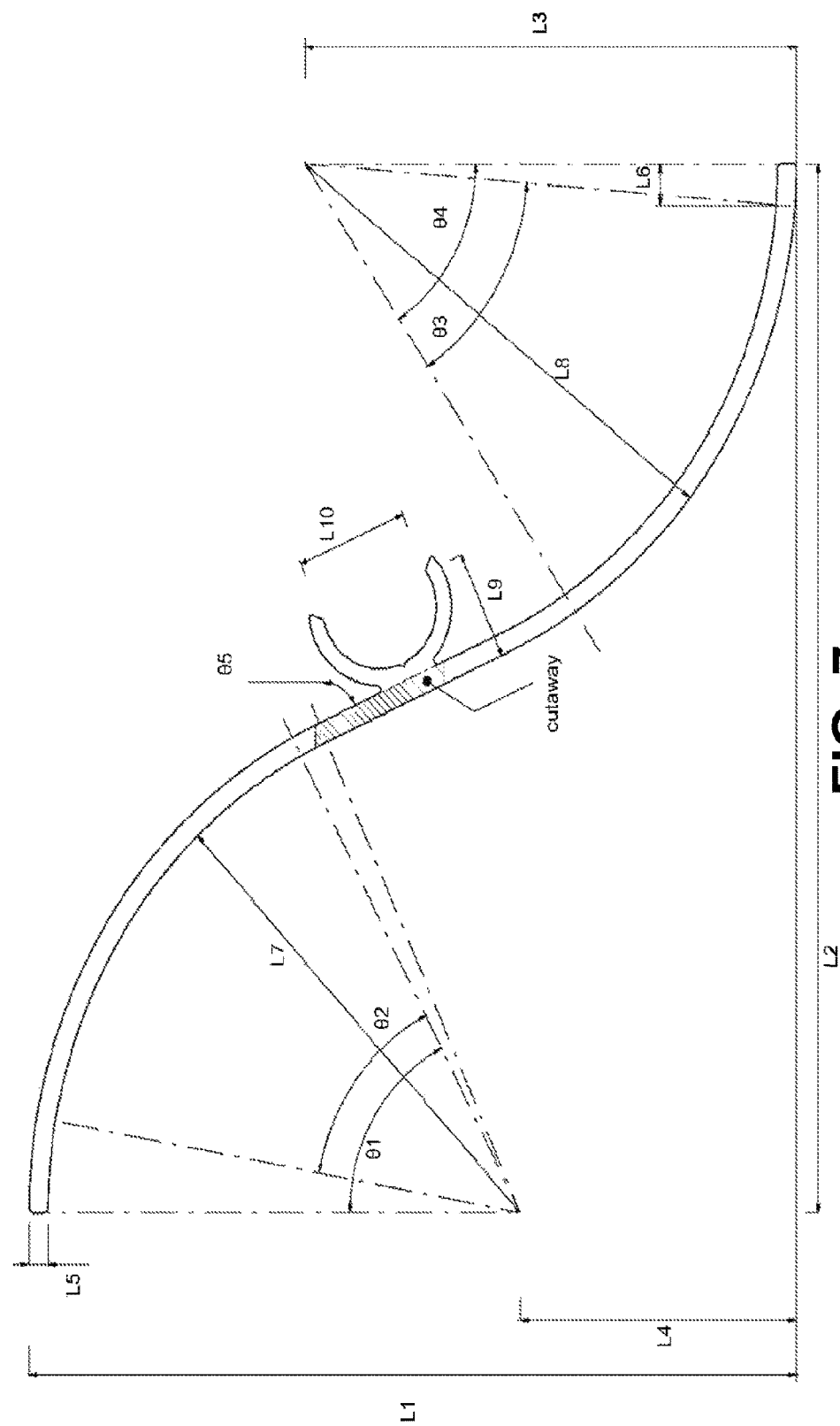
FIG. 7 is a side-view schematic illustration of a profile showing various geometric features.

FIG. 7 depicts a side schematic view of the geometry of a profile according to an embodiment. The depicted dimensions are as follows:

$\theta 1$: 62-63°
$\theta 2$: 52-53°
$\theta 3$: 58-59°
$\theta 4$: 56-57°
$\theta 5$: 58-59°
L1: 100-105 mm
L2: 125-130 mm
L3: 62-67 mm
L4: 35-40 mm
L5: 2-3 mm
L6: 2-8 mm
L7: 62-63 mm
L8: 64.5-65.5 mm
L9: 13-14 mm
L10: 14-15 mm (+/−0.1 mm)

The provided dimensions are for an exemplary embodiment and should not be understood to limit other embodiments of the present disclosure. In the embodiment, the tolerances of the "C" channel together with the tolerances of the copper tube (not shown) that will be inserted in it result in the ability to clamp or snap the piping into the profile when they are pressed together. This enables an optimal heat transfer area and heat transfer rate. The copper tube is a precision drawn 15.0 mm OD, seamless and semi-hard drawn copper tube. To ensure a high precision fit in the "C" channel, the copper is calibrated and hardened. The tolerances of the OD are within ±0.02 mm. The copper tubing is tested with the "Eddy Current Method" and proofed for any hairline cracks. Other embodiments may optionally employ deeper geometry in the profile.

Figure 8A:
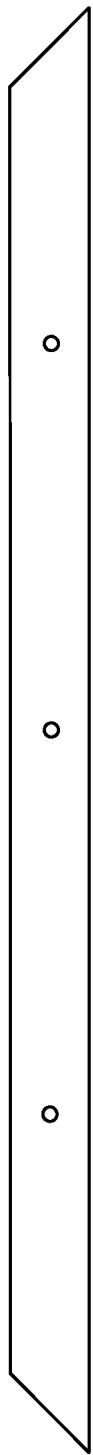
FIG. 8A is a side-view schematic illustration of a support bracket of an embodiment.
Figure 8B:
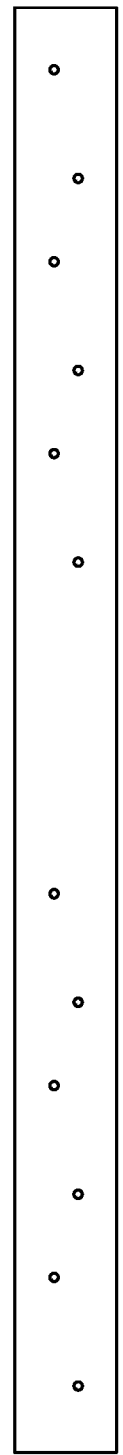
FIG. 8B is a bottom schematic illustration of the support bracket of FIG. 8A.

FIG. 8A is a side plan view of the support frame of an embodiment. FIG. 8B is a bottom plan view of the support frame of FIG. 8A. Evident is the wave hole pattern that allows for the attachment of profiles.

Figure 9B:
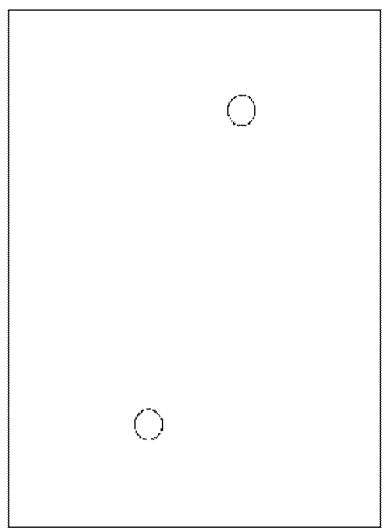
FIG. 9B is a top-plan view of the mounting bracket of FIG. 9A.
Figure 9C:
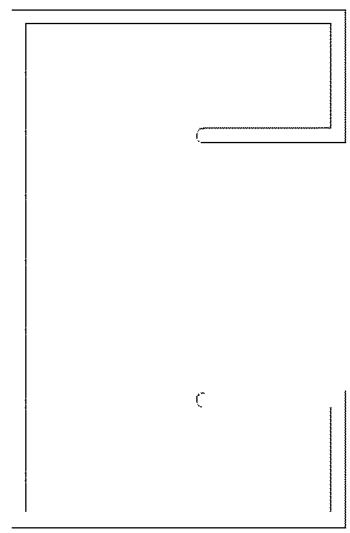
FIG. 9C is a front-plan view of the mounting bracket of FIG. 9A.
Figure 9A:
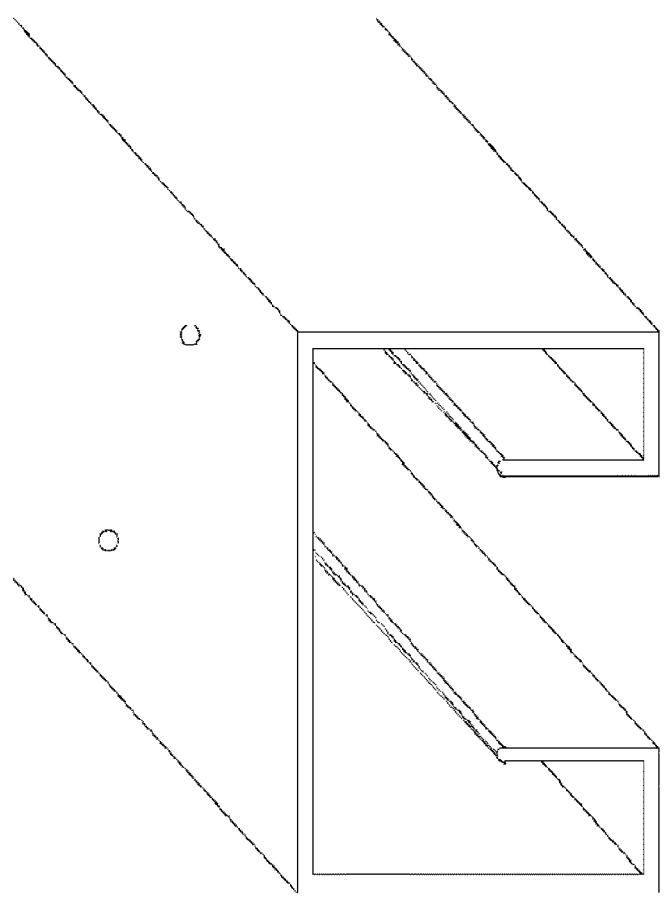
FIG. 9A is a perspective schematic illustration of mounting bracket of an embodiment.

FIG. 9A is a perspective view of a mounting bracket of an embodiment heat exchange assembly. As seen best in FIGS. 2 and 3, a mounting bracket can be used to attach profiles to a support frame. FIG. 9B is a top plan view of the mounting bracket of FIG. 9A. FIG. 9C is a front plan view of the mounting bracket of FIG. 9A.

FIG. 10 is a perspective view of a support bracket of an embodiment heat exchange assembly. As seen best in FIGS. 2 and 3, the support bracket has a surface whose contour follows that of a profile (not pictured) to which it is attached.

Figure 11:
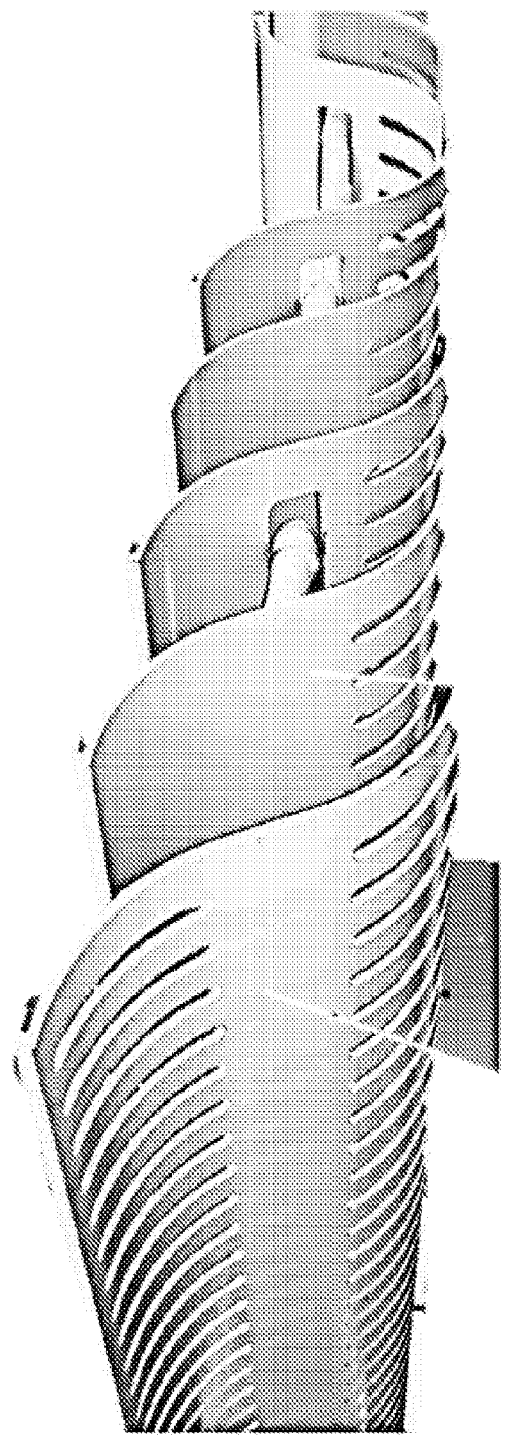
FIG. 11 is an illustration of another embodiment as suspended from a ceiling.

FIG. 11 is an illustration of an embodiment heat exchange assembly as could be suspended from a ceiling in an environment.

In certain embodiments, a dew point monitor is included and determines the dew point temperature in the environment. A flow controller is configured to limit flow of fluid through the piping, thereby avoiding any condensation. Sensors for this purpose are preferably located off a main pipeline.

Systems according to the disclosed subject matter are designed for high heat loads and are developed for use with both open and closed ceilings. Due to the purpose designed profile and the geometry of the unit an increase in convective cooling capacity is achieved. Systems according to the disclosed subject matter are effective for use as spot cooling elements or simply as a chilled ceiling. Systems according to the disclosed subject matter are designed for use in various environments such as commercial and residential buildings, office buildings, schools, and manufacturing facilities.

Certain embodiments of the disclosed subject matter have a unique appearance that is both functional and architecturally appealing.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following various embodiments.

What is claimed:

1. A heat exchange assembly, comprising:
   a plurality of profiles arranged in an parallel array, each profile including:
   a first distal portion, a central portion and a second distal portion,
   wherein a length and a width of said central portion define a plane,
   said first distal portion having a curvature departing from said plane in a first direction, said second distal portion having a curvature departing from said plane in a second direction that is opposite said first direction;
   a spacing positioned between adjacent profiles and extending from a first side of the heat exchange assembly to a second side of the heat exchange assembly, said spacing having a width, wherein said width is greater than or equal to about 85 mm at least at said first side and said second side;
   an amount of piping that is thermally coupled with said profiles, wherein with respect to each of said profiles a portion of said piping is disposed along said length of said central portion of said profile and is parallel to said length of said central portion of said profile;
   a bracketing system configured to anchor said profiles and said piping to a surface;
   said piping configured to circulate fluid having a temperature differential with respect to an environment in which the heat exchange assembly is disposed, whereby thermal energy is transferred between said piping and said profiles by conduction and thermal energy is transferred radiantly and convectively between said profiles and said environment.

2. The heat exchange assembly of claim 1 wherein said curvature of said second distal portion is a mirror image of said curvature of said first distal portion.

3. The heat exchange assembly of claim 2, wherein each profile has a channel protruding from said central portion of said profile and having disposed therein a portion of said piping.

4. The heat exchange assembly of claim 3, wherein said channels envelop and are thermally coupled with greater than 50 percent of an outer surface area of said portion of said piping.

5. The heat exchange assembly of claim 4 wherein said profiles are constructed from one of aluminum and an aluminum alloy, and said pipe is a precision drawn copper tube.

6. The heat exchange assembly of claim 1 wherein at least one of said profiles has a plurality of slots.

7. The heat exchanger of claim 6 wherein said slots extend in radial fashion from said central portion and are located wholly within one of said first distal portion and said second distal portion.

8. The heat exchanger of claim 3, further comprising:
   a dew point monitor configured to determine a dew point temperature.

* * * * *